3,589,855
PROCESS FOR DYEING OR PRINTING POLY-
AMIDE CONTAINING TEXTILE MATERIALS
WITH MONOAZO DYESTUFFS
Hanspeter Uehlinger, Basel, Switzerland, assignor to
Sandoz Ltd. (also known as Sandoz A.G.), Basel, Switzerland
No Drawing. Filed Oct. 30, 1968, Ser. No. 772,001
Claims priority, application Switzerland, Nov. 29, 1967,
16,802/67
Int. Cl. D06p 1/02
U.S. Cl. 8—41     10 Claims

ABSTRACT OF THE DISCLOSURE

A process for the dyeing of fibres and textiles which consist of or which contain natural or synthetic polyamides, which process comprises the use of dyes of the formula

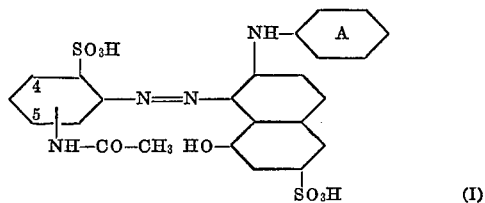

where the aromatic ring A may be further substituted.

---

In Swiss patent specification 361,067 the production of acid monoazo compounds is described. In particular Example 1 discloses the reaction of diazotized 2-amino-4-acetylaminobenzene-1-sulphonic acid with 2-(2′,4′,6′-trimethylphenyl) - amino-8-hydroxynaphthalene-6-sulphonic acid; the monoazo compound named in this example is used as an intermediate for the production of acid monoazo dyes.

It has now been found that these acid monoazo compounds can be employed with special advantage for the dyeing of natural and synthetic polyamide fibres. The present invention thus relates to a process for the dyeing of fibres and textiles which consist of or which contain natural or synthetic polyamides, which process comprises the use of dyes of the formula

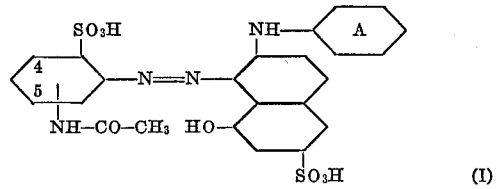

where the aromatic ring A may be further substituted.

Dyeings of very good quality are obtained with dyes of the formula

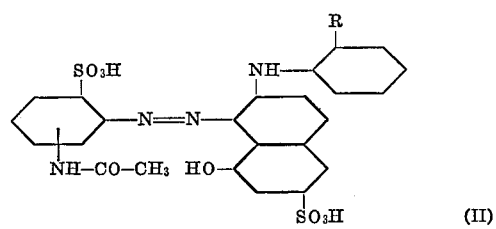

where R may stand for a halogen atom or an alkyl or alkoxy radical, though it is preferable for it to represent a lower alkyl radical having, for example, 1 to 6 carbon atoms.

Equally good dyeings are obtained with dyes of formula

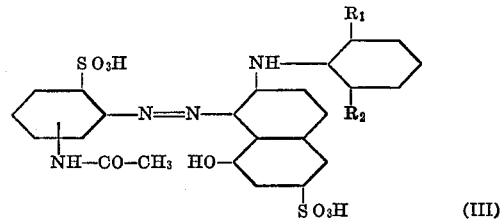

where both $R_1$ and $R_2$ represent an alkyl radical having 1 to 6 or, preferably, 1 to 4 carbon atoms.

A number of these dyes can be produced by coupling the diazo compound of an amine of the formula

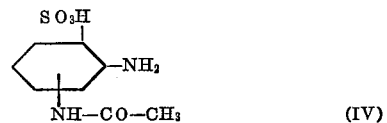

with a coupling component of the formula

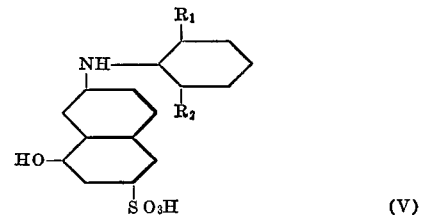

or by acylating a compound of the formula

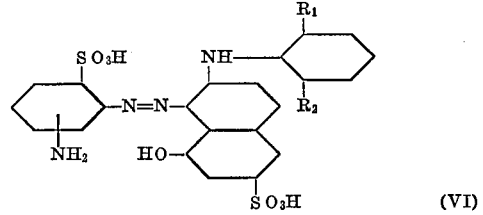

Dyeings of very high quality are obtained with the dye of the formula

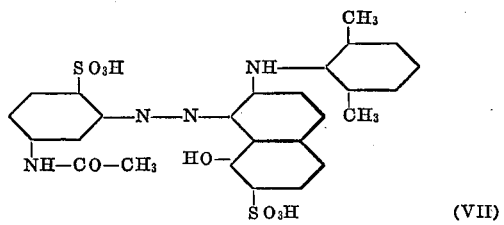

Dyeing is generally carried out in a neutral to acid bath at a pH of 2 to 7 or, preferably, 4 to 5, and in the presence of an acid, for example an organic acid, such as acetic or formic acid. The dyeings obtained have good fastness to light and to wet treatments, such as washing, perspiration, acid, alkali, milling and formaldehyde.

Wool and silk are the main natural polyamide fibres. The primarily important synthetic polyamides are the polycondensation products of dibasic organic acids, such as adipic or sebacic acid, and hexamethylene diamine, or of ω-aminoundecylic acid or poly-ε-caprolactam.

The known methods are employed to effect the coupling and acetylation reactions. The acetylamino group is preferably in the 4- or 5-position. The aromatic ring A may be substituted by halogen or by an optionally substituted alkyl or alkoxy group; if these substituents are substituted they bear preferably a halogen atom or a nitrile or hydroxyl group. In each instance halogen stands preferably for chlorine or bromine. Generally the alkyl and alkoxy radicals contain 1 to 10 or, preferably, 1 to 6 or better still 1 to 4 carbon atoms.

The use of the dye of the formula

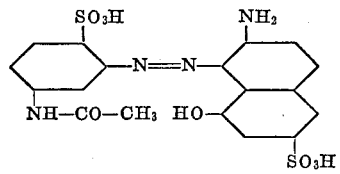

for wool dyeing is known from German patent specification 298,340. It was surprising to find that the dyes of Formula I have better formaldehyde fastness than this dye when dyed on wool. On synthetic polyamides, too, they show outstandingly good formaldehyde fastness.

In the following examples the parts and percentages are by weight and the temperatures in degrees centigrade.

EXAMPLE 1

A dyebath is prepared with 4000 parts of water, 10 parts of anhydrous sodium sulphate and 2 parts of the dye of the formula

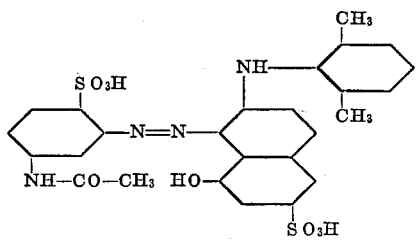

At 40° 100 parts of a wetted-out wool fabric are entered into the bath, which is then raised to the boil in 30 minutes and held at this temperature for 1 hour. At this point 4 parts of glacial acetic acid are added, after which the bath is held at the boil for a further 30 minutes until the dyeing is on shade. During dyeing the water lost by evaporation is continuously replaced. On removal from the bath the wool, which is dyed in a red shade, is rinsed with water and dried.

This process can be employed for dyeing nylon 66 and other synthetic polyamide fibres.

On natural and synthetic polyamide fibres the dye gives dyeings of good light and wet fastness, the formaldehyde fastness being particularly good.

EXAMPLE 2

The dye employed in Example 1 can be produced as follows: 23 parts of 5-acetylamino-1-aminobenzene-2-sulphonic acid are dissolved in 250 parts of water by the addition of a 20% aqueous soda solution. A solution of 6.9 parts of sodium nitrite in 24 parts of water is added and, after reacting for 15 minutes at 0–5°, the diazo suspension is dropped into a receiver containing a mixture of 29 parts of 30% hydrochloric acid, 25 parts of water and 50 parts of ice. 34.3 parts of 2-(2′,6′-dimethylphenyl)-amino-8-hydroxynaphthalene-6 - sulphonic acid are dissolved in 300 parts of water at 60° and the solution is cooled to 5°, adjusted weakly acid to Congo paper with 30% hydrochloric acid and added to the prepared diazo suspension over 15 minutes at 0–5°. The dye forms at once and settles out. After continued stirring for 1 hour the coupling reaction is complete. By the addition of 30% sodium hydroxide solution the dye is dissolved at pH 7.5 and 60°, and is subsequently precipitated by the addition of sodium chloride, filtered off and dried.

This dye gives dyeings of red shade on wool and synthetic polyamides fibres which have good fastness properties and excellent light fastness.

The structural composition of further monoazo dyes is detailed in the table below. All these dyes can be produced in accordance with the procedure of Example 2 and are dyeable by the process described in Example 1. They are of the formula

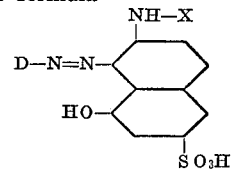

where D and X in each instance have the meanings assigned to them in the table.

TABLE

| Example No. | Radical of D=diazo component | X | Shade of dyeing |
|---|---|---|---|
| 3 | ![SO₃H / NH-CO-CH₃ phenyl] | ![phenyl] | Red. |
| 4 | Same as above | ![phenyl-CH₃] | Red. |
| 5 | do | ![phenyl with CH₃, CH₃, CH₃] | Red. |
| 6 | do | ![phenyl with CH₃, CH₃] | Red. |
| 7 | ![H₃C-OC-HN-phenyl-SO₃H] | ![phenyl] | Bluish red. |
| 8 | Same as above | ![phenyl-CH₃] | Do. |
| 9 | do | ![phenyl with CH₃, CH₃] | Do. |

TABLE—Continued

| Example No. | Radical of D=diazo component | X | Shade of dyeing |
|---|---|---|---|
| 10 | 4-($H_3C-OC-HN$)-benzenesulfonic acid (with $SO_3H$) | 2,3-dimethylphenyl ($CH_3$, $CH_3$) | Bluish red. |
| 11 | do | 2,4,6-trimethylphenyl ($CH_3$, $CH_3$, $CH_3$) | Do. |
| 12 | 3-($H_3C-OC-NH$)-benzenesulfonic acid ($SO_3H$) | 2-methoxyphenyl ($OCH_3$) | Red. |
| 13 | Same as above | 4-methoxyphenyl ($OCH_3$) | Red. |
| 14 | do | 2-ethoxyphenyl ($OC_2H_5$) | Red. |
| 15 | 2-($CH_3-OC-HN$)-benzenesulfonic acid ($SO_3H$) | 2-chlorophenyl (Cl) | Bluish red. |
| 16 | Same as above | 4-chlorophenyl (Cl) | Do. |
| 17 | do | 4-bromophenyl (Br) | Do. |
| 18 | do | 2,4-dichlorophenyl (Cl, Cl) | Do. |
| 19 | 3-($CH_3-OC-HN$)-benzenesulfonic acid ($SO_3H$) | 4-ethylphenyl ($C_2H_5$) | Red. |
| 20 | Same as above | 2,6-diethylphenyl ($C_2H_5$, $C_2H_5$) | Red. |
| 21 | do | 4-isopropylphenyl ($C_3H_7$ (iso)) | Red. |
| 22 | do | 4-n-butylphenyl ($C_4H_9(n)$) | Red. |
| 23 | do | 2,4-dimethyl-6-ethylphenyl ($CH_3$, $CH_3$, $C_2H_5$) | Red. |
| 24 | do | 2,3,5,6-tetramethylphenyl ($CH_3$, $CH_3$, $CH_3$, $CH_3$) | Red. |
| 25 | do | 2-methyl-4-ethyl-6-ethylphenyl ($CH_3$, $C_2H_5$, $C_2H_5$) | Red. |

Formulae of representative dyes of the foregoing examples are as follows:

Example 1

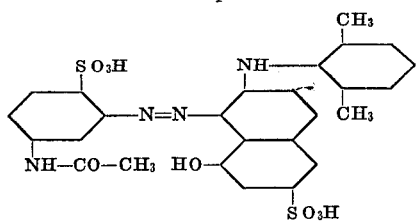

Example 4

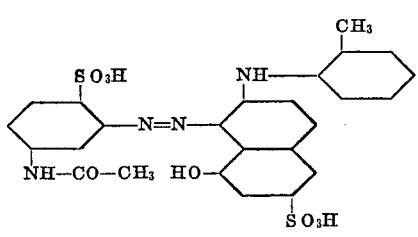

Example 5

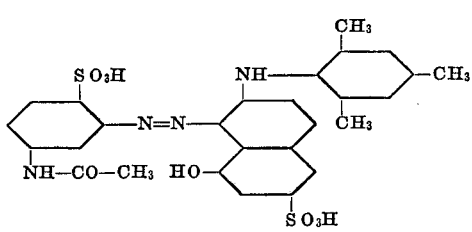

Example 10

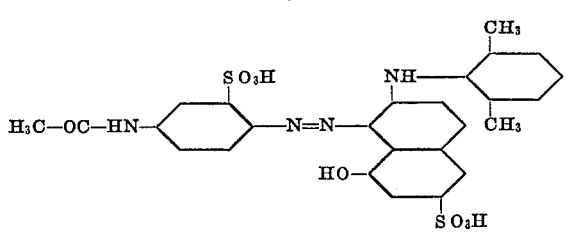

Example 11

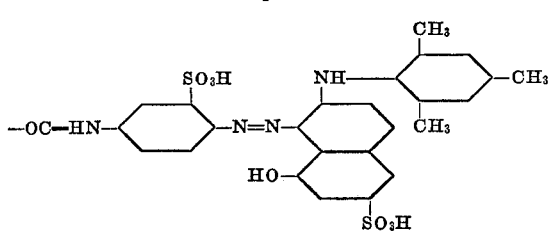

Having thus disclosed the invention what I claim is:

1. A process which comprises dyeing or printing polyamide-containing fibre or textile with dye of the formula

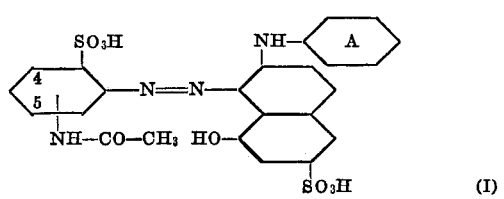

where the aromatic ring A may be further substituted.

2. A process according to claim 1, wherein the dye is of the formula

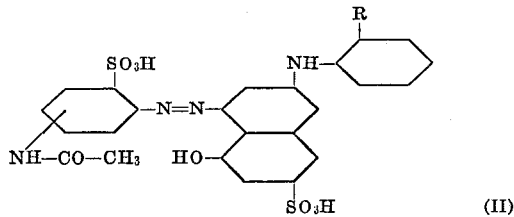

where R represents a halogen atom or an alkyl or alkoxy radical.

3. A process according to claim 2 wherein R represents a lower alkyl radical.

4. A process according to claim 1, wherein the dye is of the formula

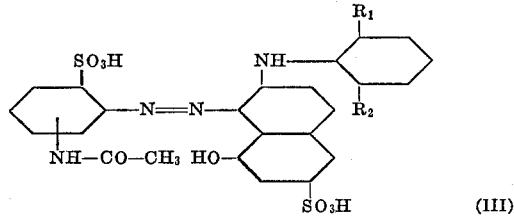

where each of $R_1$ and $R_2$ represents an alkyl radical.

5. Polyamide containing textile materials dyed or printed by the process according to claim 1.

6. A process according to claim 1 wherein the dye is of the formula

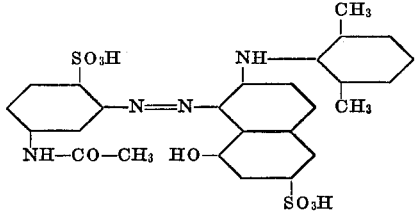

7. A process according to claim 1 wherein the dye is of the formula

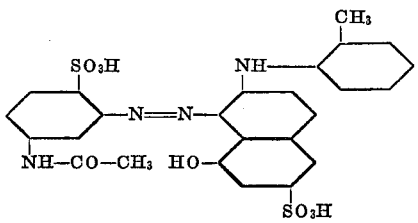

8. A process according to claim 1 wherein the dye is of the formula

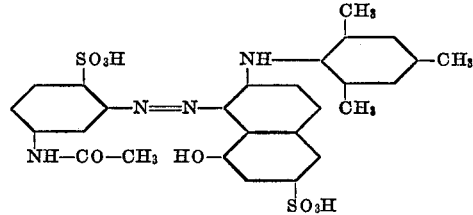

9. A process according to claim 1 wherein the dye is of the formula

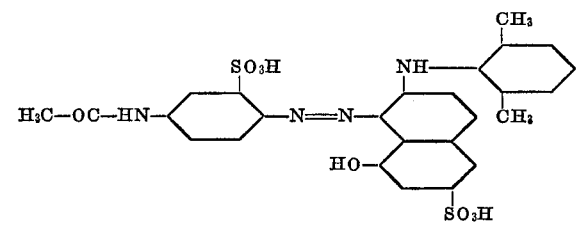

10. A process according to claim 1 wherein the dye is of the formula
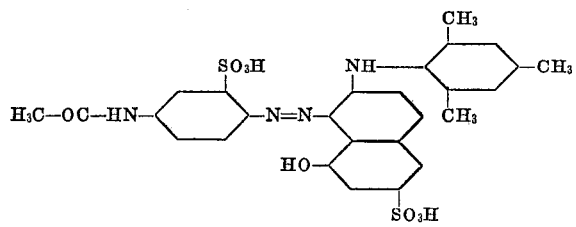
References Cited
UNITED STATES PATENTS
1,201,544 10/1916 Bergdolt _____ 260—199
3,116,280 12/1963 Frisch et al. _____ 260—199
GEORGE F. LESMES, Primary Examiner
T. J. HERBERT, JR., Assistant Examiner
U.S. Cl. X.R.
8—43, 178; 260—199